(No Model.)
C. C. TOWNSLEY.
CORN SHELLER.
No. 453,270. Patented June 2, 1891.
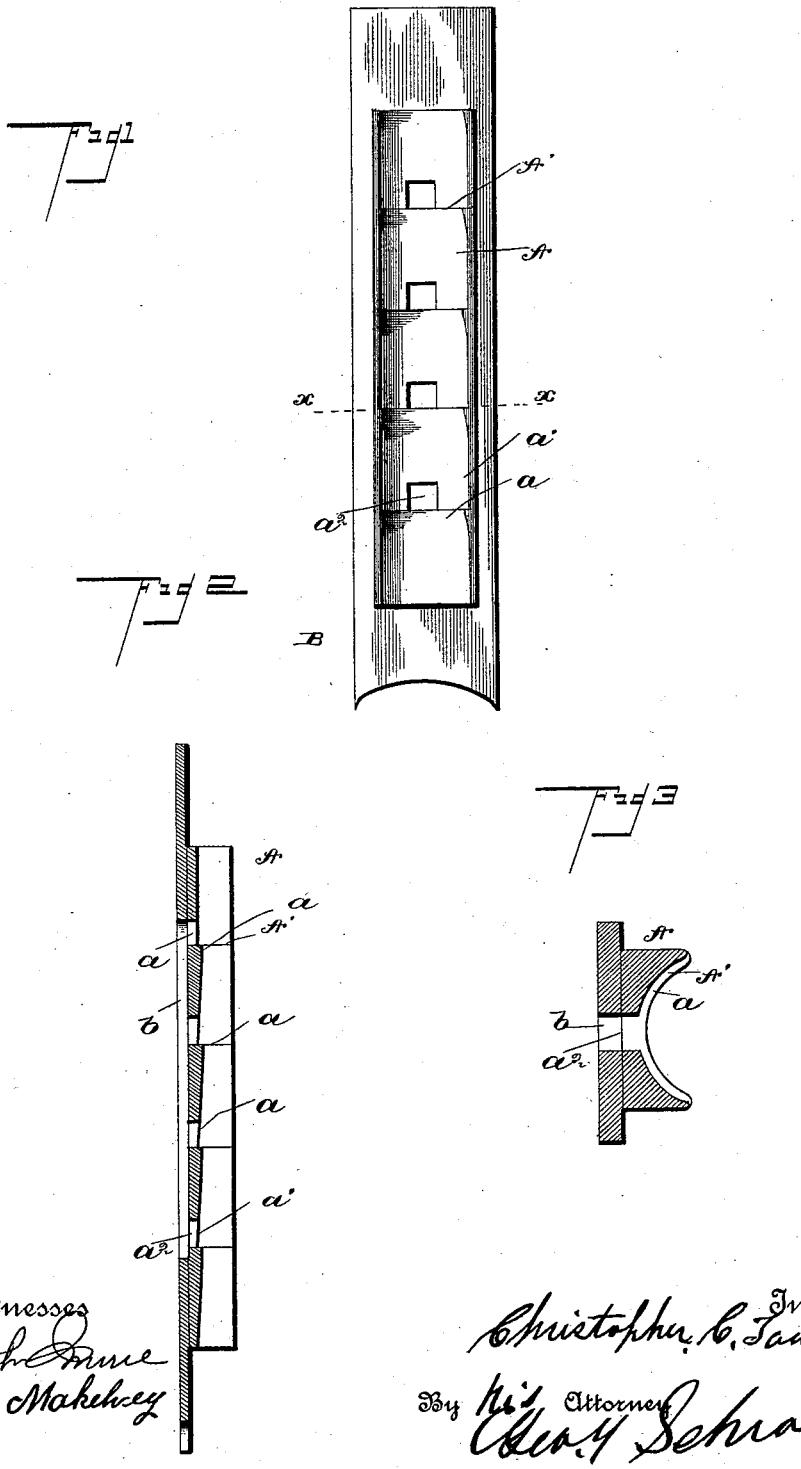
Witnesses
John Inne
L. Mahehey
Inventor
Christopher C. Townsley.
By his Attorney
Geo. H. Schrader
THE NORRIS PETERS CO., PHOTO-LITHO., WASHINGTON, D. C.

UNITED STATES PATENT OFFICE.

CHRISTOPHER C. TOWNSLEY, OF JOHNSON CITY, TEXAS.

CORN-SHELLER.

SPECIFICATION forming part of Letters Patent No. 453,270, dated June 2, 1891.

Application filed October 9, 1890. Serial No. 367,548. (No model.)

*To all whom it may concern:*

Be it known that I, CHRISTOPHER C. TOWNSLEY, a citizen of the United States, residing at Johnson City, in the county of Blanco and State of Texas, have invented certain new and useful Improvements in Corn-Shellers; and I do declare the following to be a full, clear, and exact description of the invention, such as will enable others skilled in the art to which it appertains to make and use the same, reference being had to the accompanying drawings, and to the letters of reference marked thereon, which form part of this specification.

My invention relates to certain improvements in corn-shellers, and it has for its object to provide a cheap and effective means whereby corn may be shelled, it being especially adapted to domestic use, in which a cheap, durable, and easily-operated sheller is desired; and for these purposes it consists of a semi-cylindrical trough having serrations upon the sides and bottom thereof, so that upon pushing the ear back and forth in the trough the corn will be scraped off; and it further consists in the construction, arrangement, and combination of the several parts of which it is composed, as will be hereinafter more fully described and claimed.

Referring to the accompanying drawings, in which corresponding parts are designated by corresponding letters, Figure 1 is a front view of my invention. Fig. 2 is a longitudinal vertical section thereof on line *x x* of Fig. 1. Fig. 3 is a transverse section on line 2 2 of Fig. 1.

The semi-cylindrical trough A (which I by preference cast of iron) has a series of teeth A' upon the inner surface of its side and bottom. Each of the said teeth continues extending uninterruptedly from one side of the trough to the other in a straight line, the upper faces *a* of the said teeth being square, while the lower faces *a'* thereof are beveled. A perforation $a^2$ of sufficient size to permit the passage of a grain of corn is formed in the bottom of the said trough above the square upper face *a* of each tooth, the said perforations being over a longitudinal slot *b'* in the board B, to which latter the trough is secured and which forms a support therefor.

In the use of my invention the trough is placed in a convenient position (preferably upright or inclined) and the ears of corn pushed by hand up and down therein, it being revolved at the same time in order to bring all parts of it under the action of the teeth, which will engage the corn and pull it from off the ears, the shelled corn falling through the perforations $a^2$ and slot *b'* into a suitable receptacle, which may be placed in a position to catch it.

Having thus described my invention, what I claim is—

In a corn-sheller, the combination of a semi-cylindrical trough having teeth upon the inner surface of its sides and bottom, each of the said teeth extending uninterruptedly from side to side thereof in a straight line having a square upper face, the bottom of the said trough having a perforation therein above the square face of each of the said teeth, and a base-board supporting the said trough and having a slot therein below the said perforations, as described.

In testimony whereof I affix my signature in presence of two witnesses.

CHRISTOPHER C. TOWNSLEY.

Witnesses:
  JNO. C. CASPARIS,
  R. B. MADDOX.